(12) United States Patent
Rein

(10) Patent No.: US 6,639,872 B1
(45) Date of Patent: Oct. 28, 2003

(54) REMOTE ENERGY SUPPLY PROCESS AND SYSTEM FOR AN ELECTRONIC INFORMATION CARRIER

(76) Inventor: Claus Rein, Hans-Böheirn-Strasse 5, D-01309 Dresden (DE)

(*) Notice: Subject to any disclaimer, the term of this patent is extended or adjusted under 35 U.S.C. 154(b) by 0 days.

(21) Appl. No.: 09/581,037

(22) PCT Filed: Dec. 7, 1998

(86) PCT No.: PCT/DE98/03642
§ 371 (c)(1),
(2), (4) Date: Jul. 10, 2000

(87) PCT Pub. No.: WO99/30266
PCT Pub. Date: Jun. 17, 1999

(30) Foreign Application Priority Data

Dec. 8, 1997 (DE) .......................... 197 55 893

(51) Int. Cl.⁷ ............................ G06K 7/00; G06K 19/07
(52) U.S. Cl. ....................... 367/140; 310/318; 310/319; 340/825.06
(58) Field of Search ................ 367/133, 140; 340/825.06; 310/318, 319

(56) References Cited

U.S. PATENT DOCUMENTS

| 5,159,580 A | 10/1992 | Andersen ..................... 367/132 |
| 5,594,705 A | 1/1997 | Connor ........................ 367/13 |
| 5,861,018 A | * 1/1999 | Feierbach ..................... 607/60 |
| 5,982,297 A | * 11/1999 | Welle ..................... 340/870.16 |
| 5,982,520 A | * 11/1999 | Weiser et al. ................ 359/172 |
| 6,037,704 A | * 3/2000 | Welle ......................... 310/339 |

FOREIGN PATENT DOCUMENTS

| EP | 0536430 | 9/1991 |
| JP | 6085635 | 5/1985 |

* cited by examiner

Primary Examiner—Ian J. Lobo
(74) Attorney, Agent, or Firm—Norris McLaughlin & Marcus

(57) ABSTRACT

Remote energy supply process and system for an electronic information carrier. Known processes and devices do not allow supplying energy wirelessly to an information carrier arranged inside a thick-walled and/or metallic body because energy radiation based on electromagnetic waves hardly penetrates, if at all, such bodies and contactlessly transmitted ultra-sound does not effectively penetrate them. The system consists of a basis apparatus fitted with an acoustic transmission unit in loose connection by a superficial body contact with a functional object. The information carrier is located inside this functional object, in an acoustically solid connection therewith. This creates a closed, acoustically well coupled total system which ensures an effective energy and information transmission by acoustic means. The invention is applicable for the transmission of codes and information in the electronic entry/access authorization field and product identification.

11 Claims, 2 Drawing Sheets

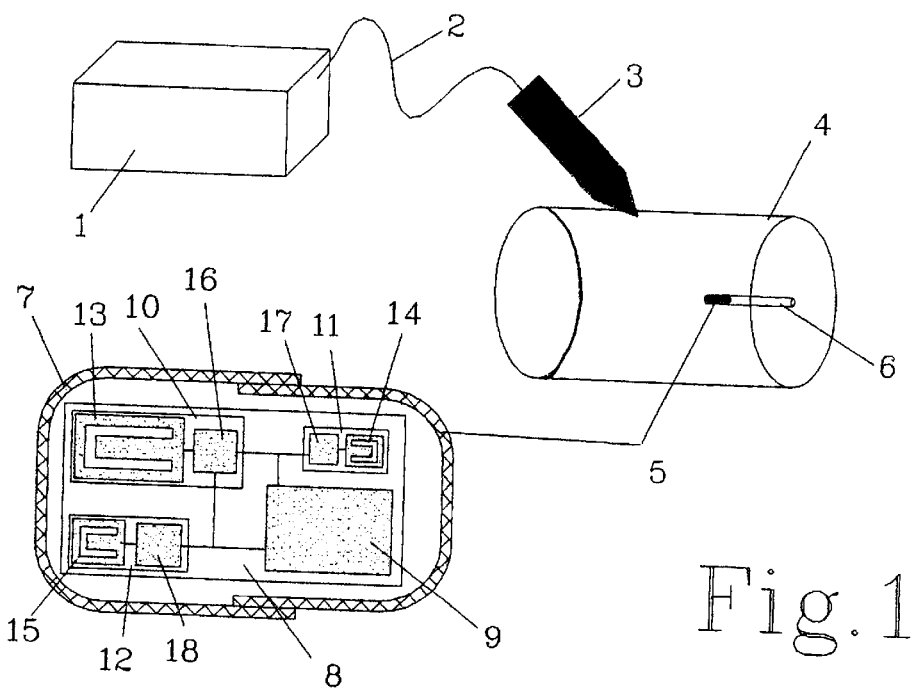
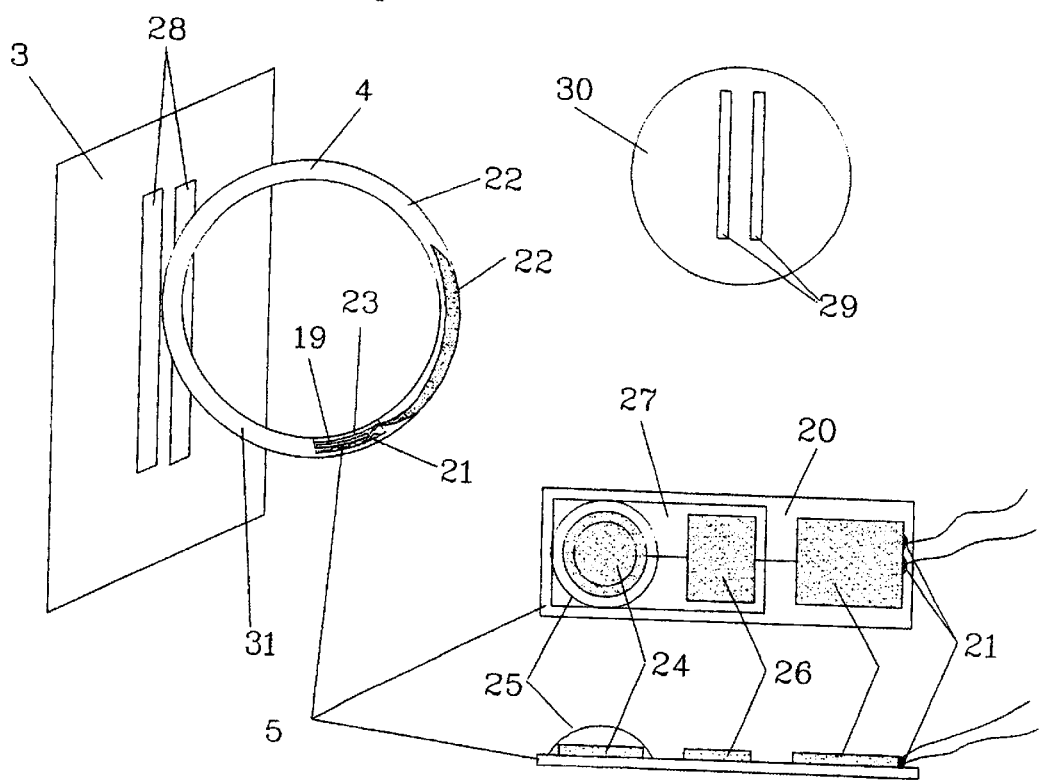

REMOTE ENERGY SUPPLY PROCESS AND SYSTEM FOR AN ELECTRONIC INFORMATION CARRIER

BACKGROUND OF THE INVENTION

This invention is related to a method and an arrangement for remote energy and information transmission via ultrasound.

There have been known methods and arrangements, in which in an electronic communication arrangement of separate electronic communication units a base device is used to supply other communication units with energy in order to dispense in the latter with electrochemical energy stores such as accumulators or batteries. This form of energy supply avoids fault risks due to an exhausted energy store; no replacement of energy stores is required, and the respective communication units are maintenance-free and compact, completely sealed and therefore allow a very robust design. Energy and/or information may be transmitted via contacts or contact-free, e.g. by electrically conductive connections, ultrasound, optical means, or radio frequency waves. Each of these transmission types has specific advantages and disadvantages.

The specific advantage of using ultrasonic sound is that it spreads in any substantial media. EP 0536 430 A1(H04B 10/00) describes a method for energy supply of a remote-control hand-held transmitter, e.g, for a motorcar locking system, using ultrasonic sound. The hand-held transmitter includes an energy store in the form of a capacitor and receives its recharging energy in a non-contacting manner through the air from the car. JP 60-85637 (H04B 11/00) illustrates ultrasound information exchange between an external device and an electronic card calculator. To this end, the card calculator is inserted into the device where the ultrasound transmission is performed by means of piezoelectric elements being arranged close to each other, but without direct contact. DE 196 08b 515 C1 (G06K 19/07) shows a chip card comprising a piezoelectric membrane. When inserted into a reading device and hold in place by springs but without contact between the membrane and the reading device, the chip card receives ultrasound energy.

The non-contacting way of transmission may be advantageous with respect to ease of handling and flexibility. On the other hand, air sound transmission methods imply high transmission losses. As becomes evident from the aforementioned documents, this disadvantage may be counteracted against by using short transmission distances or—as mentioned in EP 0536 430—by sound convergence.

Acoustic waves spread significantly better in condensed substances—metallic or non-metallic—than in gases. Especially with respect to the transmission through metals, ultrasound has unique advantages compared with radio frequency transponders, radio or optical methods which cannot be used here as metals are practically opaque to radio waves of optical radiation. On the other hand, the low sound absorption of metals allows information transmission by ultrasound over longer distances, e.g. via heating pipeline systems in buildings (DE 92 10 894 (H04B 11/00)), moving machine elements (DE 40 13 978 A1 (H04B 11/00)), or the metal structures of ships (U.S. Pat. No. 5,159,580 (H04B 11/00)). In these cases, the ultrasound transmitting and/or receiving units are either fixedly installed on the respective sound conductor or fixedly clamped to it (U.S. Pat. No. 5,159,580). U.S. Pat. No. 5,594,705 (H04B 17/00) describes an arrangement for energy and information transmission using ultrasound between two ultrasound transducers which are arranged on both sides of a non-piezoelectric medium and directly opposite to each other. This arrangement is illustrated with respect to a measuring arrangement for receiving and transmitting pressure measuring values through a ship's wall into the interior space of a ship wherein the measuring arrangement mounted onto the outer surface of the ship is supplied with energy by ultrasound through the ship's wall.

In all aforementioned documents about the contacting energy and/or information transmission, the communication units are fixedly installed while the functional article serving as transmission medium is only used as sound conductor to transmit external data. In case of applications not requiring large measuring arrangements and in which it is required only to store data in or extract them from a functional article, in which fixed connections are disturbing, and in which the functional article should not possibly be adversely affected in its appearance, its function, and its mobility, the known arrangements and methods are inappropriate o r inapplicable. Such applications are, for example, the marking of articles or the storing of a code in a key.

SUMMARY OF THE INVENTION

It is therefore an object of the present invention to store marking data and/or codes in functional articles and to extract them from said functional articles by simple means and in a simple manner.

The solution proposed in claim 1 represents a method for energy and information transmission by means of ultrasound between a base device and an information carrier wherein the base device as well as the information carrier comprise ultrasonic transmitting and receiving units. The ultrasonic transmitting and receiving units include at least one ultrasonic transducer. The base device is on the one hand the energy source for the information carrier and on the other hand that communication unit which extracts data from or sends them to the information carrier. The information carrier is different from such communication units as described in U.S. Pat. No. 5,594,705 which do not represent information carriers but—apart from the communication channel to the base device—take in data and transmit them to the base device. The information carrier is acoustically fixed in or on a functional article, i.e. glued, luted, soldered, clamped, screwed or the like to it so as to avoid major transmission losses at the interface with said functional article. According to the present invention, the base device and the functional article are brought together for a short contact period to enable communication. A short contact period means a touch between two articles for a short time which may be abandoned at any time immediately, reversibly, and without much effort. At the contact area between the base device and the functional article, there is an energy sink via which acoustic energy can enter the functional article and flow to the information carrier. The ultrasonic transmitting and receiving unit of the information carrier which preferably operates within the resonance range of the sound frequency or within a secondary excitement range represents a particularly strong energy sink. As long as the touching contact between the base device and the functional article is maintained, the resulting potential gradient lets continuously flow in subsequent acoustic energy. Due to this inflow of energy, the information carrier is switched on, reaches its operating state due to the electric energy supplied, and triggers ultrasound information transmission via the contact area between the functional article and the base device.

With respect to fixedly installed arrangements, this approach is impossible. In particular, they always require an electric switching action on the base device side in order to put the communication unit to be supplied with energy into the operating state and to initiate information transmission. On the other hand, the method according to claim 1 allows to actuate the operating state in the information carrier and to initiate information transmission in a mechanical manner in both directions by the mutual touch of the functional article and the base device when either the functional article is brought near the base device or vice versa. As acoustic energy reaches the interior of the functional article and thus the information carrier only after the contact area and thus the transmission path has been determined and after this path has been released due to the touch during the short-time contact, it is further ensured that the information carrier enters its operating state only when information transmission is actually intended. From an energetical point of view, and—as a touch is an unambiguous action—for controlling the information transmission and the protection against unauthorised access to the memory, this means a considerable advantage with a view to the data protection laws.

A sufficient energy transmission from the base device to the information carrier requires a good acoustic coupling over the entire communication path. A physical surface contact, i.e. a touch, is required to take place at the contact area between the base device and the functional article. U.S. Pat. No. 5,594,705 ensures the reliability and quality of the ultrasonic transmission by a fixed installation which always means a surface modification of the functional article and may be visually or functionally disturbing. On the other hand, the method according to claim 1 implies a relative freedom regarding the bringing together of the functional article and the base device wherein a spatial vicinity of the communicating ultrasonic transmitting and receiving units is generally advantageous. Here, a reliable and efficient ultrasonic transmission can thus be achieved due to the flexibility in selecting an appropriate contact area—for instance a polished metal surface. In addition, the inert force of the masses of the base device and the functional article and the force exerted to bring them together ensures in many cases a sufficient contact pressure force being stable during the contact period. Furthermore, additional means such as liquids working as acoustic coupling liquids, are possible.

The method is most of all suitable for those applications which are meant to store and transmit concise data. A broad range of applications in which the method may be used in a very advantageous manner encompasses marking, short descriptions, and codes.

When implementing the method, the functional article and the base device, but not the information carrier, are exposed to mechanical contact stress. It is therefore advantageous for minimizing this stress and for handling reasons if the ultrasonic transmitting and receiving unit of the base device which is used to perform the short-time contact were formed as a separate or specifically shaped robust contact unit, for example as a hand-held device in the form of a pen or as a constructionally prominent contact area.

The ultrasonic transmitting and receiving unit of the information carrier has to fulfil the functions of energy supply, information reception, and information transmission. The respective units may be separate or united in one unit. A separate arrangement of the information transmission, information reception, and energy supply units allows a task-related optimization with respect to energy, size, function, frequency, and other parameters. This applies to the ultrasound transducer as well as the upstream and downstream electronic equipment. In other cases, however, a common utilization of several components may be preferable, for instance if it were a general main objective to miniaturize the information carrier. This opportunity is provided up to the complete integration in one single unit. In such case, energy and information are received via a common ultrasound transducer and then separated by downstream electronic equipment. Conversely, this ultrasound transducer serves as information transmitter.

Preferred energy receivers of the energy supply unit in the information carrier are ultrasound transducers on the basis of piezo-electric material, although piezo-magnetic, dynamo-electric, or other appropriate mechano-electric transducers may be used as well, as long as they transform the energy of acoustically initiated mechanical vibrations into electric energy. As an analogy, this applies to the information transmitting unit of the information carrier. Suitable information receivers are also transducers in which physical parameters such as capacity, resistance, and others serve to record sound or vibrations.

Mounting all components of the information carrier on a common base, e.g. on a ceramic, plastic or film-type printed-circuit board, is preferred for various reasons, such as handling, assembly or miniaturization. As an effective transmission of both energy and information can be effected through the bodily-acoustic contact path, it is possible to work with very small total energies and capacities. This implies the major advantage that all the components of the information carrier, from the transducer to capacitors as intermediate energy stores, to other electronic semiconductor components required, can be designed with very small space requirements. It is only by this approach that microsystems engineering dimensions can be accomplished which allow accommodating all information carrier components in an area of just a few $mm^2$ or smaller.

For practical handling purposes and other reasons mentioned below, it will be advantageous to have the information carrier available in a compact form, e.g., in a plastic-embedded body, or in the form of a capsule.

If necessary, it may be helpful to have another way of information transmission available in addition to the acoustic path, e.g., to transfer information to certain memory areas which are not to be erased later, prior to placement into the functional article. This will be possible by providing at least two metallic points of contact on the outside, which are connected in an electrically conductive manner to electronic components of the information carrier.

For large-scale application, the capability of a system of being combined with other information and/or energy transmitting systems will be advantageous. Regarding the case of the—always energy-saving—direct electric contact, this is possible wherein the information carrier may be accessed via the two metallic parts mounted on the functional article, if required. This will be particularly beneficial with respect to a multi-functional article such as a key, if some locks include an ultrasonic and others only an electric information transmitting and receiving unit.

Advantageously, the metallic element may also be employed for energy saving purposes, as it can be used in a simple manner to trigger an action; for example, switching the ultrasonic transmitting and receiving unit of the base device on, either with a time limit or during the hold time at the contacts.

Other advantages arise in the sector of locking systems. Apart from placing an information carrier in conventional keys and key-ring pendants, the function of a key could be transferred easily and inconspicuously to any other article without the function thereof being recognizable from outside. Any every-day item, such as writing implements, wristwatches, buttons, glasses, etc., would be suitable.

Specific advantages result, if pieces of jewellery and, more particularly, rings form the functional articles. These are worn closely to the body so that the risk of losing them is very small. Similarly, cards, especially those having a chip card format, could be used favourably as functional articles.

The application in the automotive sector deserves special mention. In such a case, it would not only be the car as a general product, but also various components that could individually be provided with corresponding information carriers,.

The method and the arrangement for using the method offer a widest possible placement range for the information carriers in or at functional articles. It is especially advantageous to arrange the—extremely tiny designed—information carriers in a recess formed as a cavity, countersink, or pocket hole. Such recess may be provided additionally with a seal so that it will be "deeply hidden inside the product" behind thick material layers, not recognizable from the outside and very well protected protected against destructive mechanical, chemical, electrostatic, radiation, thermal, or other influences, while it would be possible to file, read or re-write product-relevant information about the entire product life, starting from manufacture, for purposes of production, distribution, sales, servicing up to recycling,. In doing so, a chip-internal safety system may easily implement a selective read/write protection mechanism. Last but not least, a completely inconspicuous marking which can hardly or not be recognised from the outside may be advantageously used in crime prevention and tracking.

The present invention will be explained below in greater detail with reference to an example embodiment thereof.

BRIEF DESCRIPTION OF THE DRAWINGS

In the drawings:

FIG. 1 shows a sketch for explaining the fundamental principle;

FIG. 2 shows an arrangement of two locks for a finger ring forming a functional article;

DESCRIPTION OF THE PREFERRED EMBODIMENTS

Figure 3:
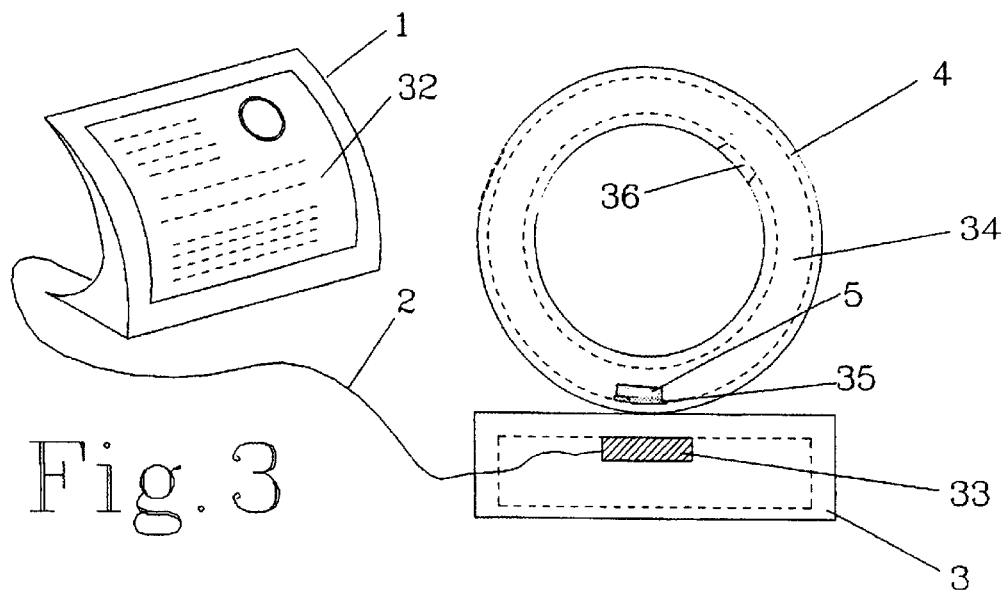
FIG. 3 shows an arrangement for identifying pieces of jewelery.

Referring to FIG. 1, there is shown a base device 1 connected through a cable 2 to the ultrasonic transmitting and receiving unit 3 designed as a hand-held device. The ultrasonic transmitting and receiving unit 3 is able to produce acoustic energy in the form of ultrasound as well as to transmit and receive acoustic information. When the functional article 4, which forms a steel block and is provided as starting material for fabricating a special gearbox member, is contacted by the ultrasonic transmitting and receiving unit 3 of the basic device 1, acoustic waves penetrate into the functional article 4 to reach the information carrier 5 on a bodily path. The information carrier 5 is adhesively bonded into the end of a deep pocket hole 6 inside the functional article 4, thereby protecting it against any accidental destructive access during subsequent turning and milling operations. In FIG. 1, the information carrier 5 is shown again on an enlarged scale and consists of a cylindrical steel capsule 7 of 4 mm diameter, housing on a silicon chip 8 the electronic information processing unit 9, i.e., a microcontroller, an energy supply unit 10, an information receiving unit 11, and an information transmitting unit 12, each consisting of a piezoelectric transducer 13, 14, 15 and a downstream electronics 16, 17 processing the electricity generated by the piezoelectric transducers 13, 14 for use in the information carrier, and an upstream electronics 18 supplying the piezoelectric transducer 15 with the information to be transmitted in the form of electric signals, respectively. Isolation of the individual piezoelectric transducers 13, 14, 15 and the electronics 16, 17, 18 associated therewith is possible due to the high obtainable degree of miniaturisation in semiconductor technology, and permits separate reception of energy and information as well as independent transmission of information. On the rear side thereof, the silicon chip 8 has been fixedly secured to the capsule 7 using an adhesive.

With the arrangement shown in FIG. 1, the operator of a machine tool may obtain essential fabrication data for the gearbox member from the information carrier 5 to supply it to the machine tool, and feed information on the result of his or her work into the information carrier 5.

In FIG. 2, there is shown a functional article 4 configured as a ring for a finger, the ultrasonic transmitting and receiving unit 3 of the base device not explicity shown—an electronic lock—configured as a plate provided for a car door, and an electric receiving unit in the form of a disk 30 for an electronic lock a letter box. The ring holds the information carrier 5 within a recess 19. All elements of the information carrier 5 are mounted onto a flexible base 20. On its exterior, the information carrier includes two metallic points of contact 21, which in turn are connected to the two metallic parts 22, shown to be formed by the ring itself and a ring element mounted in isolation from the ring. After bonding the information carrier 5 in place, the recess 19 has been closed by a lid 23. The piezoelectric transducer 24 is covered by a cap 25 to prevent the mechanically vibrating parts thereof from being impaired in their functions. Together with the electronics 26, it forms a unit 27 assuming the combined functions of the energy supply unit 10, information receiving unit 11, and information transmitting unit 12 to form the entire ultrasonic transmitting and receiving unit 39 of the information carrier 5.

On the ultrasonic transmitting and receiving unit 3 of the base device 1 in the form of the plate, there are provided two contacts 28 to be bridged when touched by the ring. Acting as a metallic element 31, the ring itself causes the bridging to occur. Thus, it will activate the ultrasonic transmitting and receiving unit 3 of the base device 1, and the exchange of information will take place with the information carrier 5 inside the ring through the contacting acoustic path. The above-mentioned letter box lock does not constitute a base device 1 as it is not provided with an ultrasonic transmitting and receiving unit. It is operated by the two contacts 29 which are used for electrically transmitting both energy and information. It receives its opening code when the two metallic parts 22 are engaged by the contacts 29.

The application of the present invention to the identification of jewellery is illustrated in FIG. 3. As shown, the base device 1 forms a reading and programming device including a display screen 32, and is connected through a cable 2 to the ultrasonic transmitting and receiving unit 3, in which a piezoelectric transducer 33 is mounted below a supporting steel plate. Onto that supporting plate, the functional article 4 shown in FIG. 3 as having the form of a ring for a finger, but which may also be a brooch, watch, bracelet or other piece of jewellery, may be placed or pressed. Inside the functional article 4, there is located a recess 34 in the form of a cavity. The information carrier 5 may be inserted through a hole into the cavity 34, and secured with adhesive 35. On completion of such assembly work, the hole may be closed by a closure 36 made of the same material as the functional article 4. Apart from adhesive bonding, brazing and welding are also possible techniques for assembling, during which the mounting site of the information carrier 5 will have to be cooled, if necessary. After the closure 36 has been welded to the ring forming the functional article 4, and after the surface has been correspondingly re-worked, it will be impossible to recognize from the outside that an information carrier 5 is mounted within the ring. To ensure communication, information carrier 5 need not necessarily confront the piezoelectric transducer 33 directly as shown in FIG. 3, although the shortest distance is generally preferred. Because the information carrier 5 is completely surrounded by metal within the functional article 4, any destruction of the electronics of the information carrier 5 by possible external electrostatic fields or charging actions will be virtually excluded.

Figure 4:
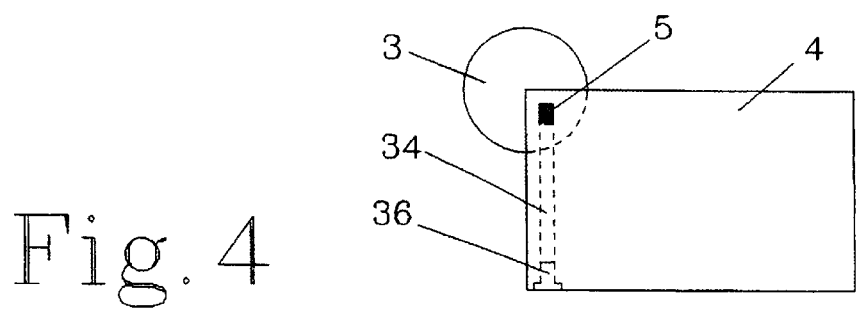
FIG. 4 shows an arrangement including a card having the standard chip card format as a functional article.

This equally applies to the application shown in FIG. 4 where the functional article 4 has the form of a chip card, which in this case consists completely of metal. Use of special steel or titanium alloys may be preferred. Chip cards of that kind may be designed in a more rugged way compared to known plastic chip cards in terms of mechanical strength, environmental durability and protection against electrostatic hazards. Handling, too, is extremely easy by placing it onto the corresponding ultrasonic transmitting and receiving unit 3 which corresponds to the read/write interface or reader for known chip cards.

Figure 5:
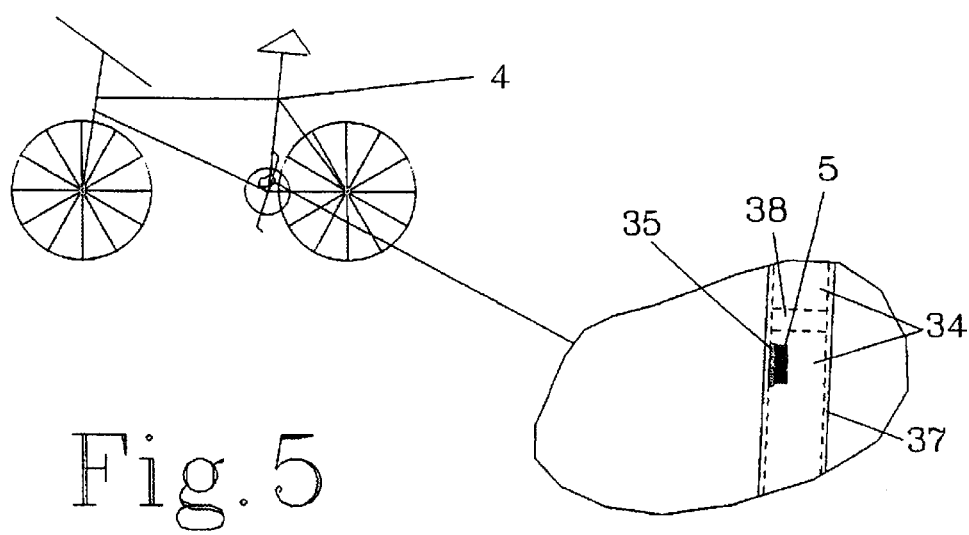
FIG. 5 shows a partial arrangement including a bicycle as a functional article used for the identification thereof.

Another very practical usage is pointed out in FIG. 5. Placing the information carrier in a bicycle forming the functional article 4, e.g., in the frame member 37, will be a very simple and unobtrusive way of identifying bicycles. By means of a plug 38, removal of such an identification may be prevented or made so difficult that it can be accomplished only by destroying the bicycle forming the functional article 4, which is not in the interest of bicycle thieves either.

In summary, the embodiment shown in FIGS. 1–5 illustrates that any articles may be transformed into functional articles 4, by mounting in the interior thereof an information carrier 5 e.g. of the kind shown in FIG. 1 and 2. For this purpose, miniaturisation of the information carrier 5 is an important condition, so as to be able to equip even small articles with an information carrier 5, impair as little as possible the external appearance of the articles along with the properties and applications thereof, and not to restrict their mobility. As a result of the present invention, articles become capable of communicating. In the invention, mono- or bi-directional communication typically is initiated and maintained during the surface contact between the ultrasonic transmitting and receiving unit 3 of a base device 1 and the articles 4. Establishing the contact, which in general will be made only during the energy and information transmission, can be carried out by manual or mechanical movement of the ultrasonic transmitting and receiving unit 3 toward the functional article 4, or vice versa. The information underlying the communication may be entered from outside using the ultrasonic transmitting and receiving unit 3 of a base device 1, as is shown in FIGS. 1–5, or it may be supplied independently thereof to the information carrier 5 and stored therein. This may be performed by acoustic or other means, such as electric lines.

What is claimed is:

1. A method for transmitting energy and information via ultrasound between a base device and an electronic information carrier containing stored information and being fixed to a functional article with an acoustical coupling, the method comprising the steps of:

providing ultrasonic transmitting and receiving units in the base device and in the information carrier;

temporarily contacting the base device to the functional article via contact areas, so that ultrasonic transmission is provided between the base device and the functional article and whereby an ultrasonic field is created in the functional article, which provides energy to switch on the information carrier for providing an operating state;

causing ultrasonic information transmission between the information carrier and the base device, and wherein the functional article operates as a key.

2. The method according to claim 1, wherein the information stored in the information carrier characteristic of the functional article.

3. An arrangement for transmitting energy and information via ultrasound, the arrangement comprising:

a base device;

a functional article;

an electronic information carrier being arranged on or in the functional article;

the base device and the information carrier comprise ultrasonic transmitting and receiving units, wherein the base device includes an acoustic transmitting unit which is formed such as to provide a temporary contact with the functional article, and wherein the information carrier contains information in the form of marking and/or codes, characteristic of the functional article, and wherein the functional article operates as a key.

4. The arrangement according to claim 3, wherein the information carrier comprises elements and dimensions of a micro system.

5. The arrangement according to claim 3, wherein the information carrier is formed as a compact body including components that comprise the information carrier.

6. The arrangement according to claim 3, wherein the information carrier is a hollow capsule containing electronic components.

7. The arrangement according to claim 6, wherein the hollow capsule is made of metal.

8. The arrangement according to claim 6, wherein the hollow capsule is made of an organic material selected form one of polymeric plastic glass, cermet, stone, mineral or precious stone and composites.

9. The arrangement according to claim 6, wherein the information carrier has an outside including at least two metallic contacts electrically connected to the electronic components transmitting both electric energy and information.

10. The arrangement according to claim 9, wherein the functional article has an outside including at least two metallic contacts electrically connected to the contacts of the information carrier thereby permitting a transmission of both electric energy and information to said information carrier.

11. The arrangement according to claim 3, wherein the transmitting unit has an outside on which two contacts are formed and wherein the functional article includes an outside provided with metallic elements which are formed such as to engage with the contacts of the transmitting unit.

\* \* \* \* \*